United States Patent [19]

Liu

[11] Patent Number: 4,513,119

[45] Date of Patent: Apr. 23, 1985

[54] POLYCARBONATE RESIN MIXTURES

[75] Inventor: Ping Y. Liu, Naperville, Ill.

[73] Assignee: General Electric Company, Mt. Vernon, Ind.

[21] Appl. No.: 487,170

[22] Filed: Apr. 21, 1983

[51] Int. Cl.$^3$ .................. C08L 53/02; C08L 23/00; C08L 69/00

[52] U.S. Cl. .................. 525/92; 525/93; 525/95; 525/98; 525/146; 525/148

[58] Field of Search .......... 525/92, 148, 146, 93, 525/95, 98

[56] References Cited

U.S. PATENT DOCUMENTS

| | | | |
|---|---|---|---|
| 3,431,224 | 3/1969 | Goldblum | 525/148 |
| 4,081,424 | 3/1978 | Gergen et al. | 525/148 |
| 4,218,545 | 8/1980 | Serini et al. | 525/92 |
| 4,384,076 | 5/1983 | Ohara et al. | 525/67 |
| 4,424,303 | 1/1984 | Liu | 525/67 |

FOREIGN PATENT DOCUMENTS

| | | |
|---|---|---|
| 0028753 | 10/1980 | European Pat. Off. . |
| 3202477 | 1/1982 | Fed. Rep. of Germany . |
| WO82/03222 | 9/1982 | PCT Int'l Appl. . |

OTHER PUBLICATIONS

Heinert, Polycarbonate Blends with Improved Critical Thickness, Res. Discl. No. 2081g, Dow Chemical Co., Aug. 1981.

*Primary Examiner*—Allan M. Lieberman
*Attorney, Agent, or Firm*—Martin B. Barancik

[57] ABSTRACT

Novel compositions with high resistance environmental stress cracking and crazing comprise:
(a) an aromatic carbonate polymer; and
(b) a modifier combination therefor comprising:
  (i) a coupled resinous block copolymer of polymerized vinyl aromatic compound and a polymerized diene;
  (ii) an olefin-acrylate or methacrylate copolymer; and
  (iii) a precompounded homogeneous resin composition, compatible under working conditions, comprising an olefinic resin and an elastomeric polyisobutylene resin.

9 Claims, No Drawings

POLYCARBONATE RESIN MIXTURES

BACKGROUND OF THE INVENTION

This invention relates to thermoplastic resin compositions and more particularly is concerned with polycarbonate resin mixtures having improved impact strength, especially in thick sections, and extraordinary resistance to environmental stress crazing and cracking.

Aromatic carbonate polymers are well known, commercially available materials having a variety of applications in the plastics art. Such carbonate polymers may be prepared by reacting a dihydric phenol, such as 2,2-bis(4-hydroxyphenyl)-propane, with a carbonate precursor, such as phosgene, in the presence of an acid binding agent. Generally speaking, aromatic polycarbonate resins offer a high resistance to the attack of mineral acids, may be readily molded, and are physiologically harmless as well as strain resistant. In addition, such polymers have a high tensile and impact strength (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane, no lead gasoline, acetone, heptane and carbon tetrachloride when such solvents are in contact with stressed parts fabricated from aromatic polycarbonate resins. The most significant effect is a loss in vital impact strength and also an increase in brittle-type failure. Contact with such solvents may occur, for example, when parts are used under the hood of automobiles, or near the gasoline filler ports thereof, or when solvents are used to clean or degrease stressed parts made from polycarbonate resins.

At present, no entirely satisfactory means is available for reducing environmental stress crazing and cracking of polycarbonate resins, although a variety of methods have been proposed.

In Goldblum, U.S. Pat. No. 3,431,224, assigned to the same assignee as this application, for example, it is proposed to add modifiers to polycarbonate, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ether, and a polyurethane elastomer. While the results with such modifiers are generally excellent, in thin sections, e.g., ⅛ inch, it has been found that there is a tendency for failure to occur with these modifiers in thicker molded parts, e.g., of ¼ inch thickness, and such failure is of the undesirable brittle type, especially after exposure to high test gasoline. Another modifier proposed to be added to polycarbonate is reported in Research Disclosure No. 20810. Dow Chemical Company, August, 1981. Data are provided showing that polycarbonate modified with a linear low density polyolefin, namely ethylene/octene-1 copolymer, provide good impact strength at increased part thickness. There is no suggestion therein that such a modifier will significantly enhance resistance to environmental stress crazing and cracking, and, as will be shown hereinafter, soaking a composition modified with a linear low density copolymer of ethylene and octene-1, even in thin sections, causes the impact strength to deteriorate substantially and results in brittle failure. Still other modifiers have been proposed for impact strength improvement, but none of them provides optimum environmental stress crazing and cracking resistance—applicant's earlier filed commonly assigned U.S. patent applications, Ser. No. 238,643, filed Feb. 26, 1981, now abandoned; Ser. No. 343,949, filed Feb. 29, 1982, now U.S. Pat. No. 4,430,476; Ser. No. 352,382, filed Feb. 25, 1982, now U.S. Pat. No. 4,444,949, and Ser. No. 421,788, filed Sept. 23, 1982, being expressly mentioned in this connection. Ser. Nos. 238,643 and 352,382 describe polycarbonates modified with a combination of a butadiene-styrene block copolymer of the coupled resinous type, an acrylate core-shell interpolymer and, optionally, an olefin/acrylate copolymer. Such compositions process well and are toughened, but there is no disclosure of significant solvent resistance and, as will be shown later herein, by themselves, the coupled resinous block copolymers do not provide significant resistance to environmental stress crazing and cracking at relatively low and moderate blending levels, even in thin sections. Ser. No. 343,959, now abandoned, describes polycarbonate resins modified with a combination of the coupled resinous block copolymers and a linear low density polyolefin resin. There is no mention that such modifier combiantions will provide enhanced resistance to environmental stress crazing and cracking. Ser. No. 421,788 discloses that polycarbonate resins modified with coupled resinous block copolymers, olefin/acrylate copolymers and, optionally, polyolefins have good environmental stress crazing and cracking resistance.

SUMMARY OF THE INVENTION

Unexpectedly, in view of the foregoing, it has now been discovered that polycarbonate resins may be rendered more resistant to environmental stress crazing and cracking and may be simultaneously provided with enhanced impact strength in thick-walled molded sections by incorporating therewith, in certain proportions, a modifier combination comprising a coupled resinous diene-vinyl aromatic block copolymer, an olefin copolymer with an acrylate or methacrylate comonomer, and in addition, a precompounded, homogeneous resin blend, compatible under working conditions, comprising an olefinic resin and an elastomeric polyisobutylene resin.

It has now been found that when the above-mentioned modifier combination is added to the polycarbonate resin, within a certain range, the resultant mixture possesses a resistance to environmental stress crazing and cracking greater than that possessed by the polycarbonate resin itself and in some instances better than the comination utilizing separate non-precompounded olefinic resin and elastomeric polyisobutylene resin.

DESCRIPTION OF THE INVENTION

In accordance with the present invention it has been found that the foregoing desirable properties are obtained with resin mixtures comprising an intimate admixture of:
(a) an aromatic polycarbonate resin; and
(b) a modifier combination therefore comprising:
  (i) a coupled resinous block copolymer having blocks comprising polymerized vinyl aromatic units connected to blocks comprising polymerized diene units;

(ii) a copolymer of an olefin and at least one of a $C_1$–$C_6$ alkyl acrylate, a $C_1$–$C_6$ alkyl methacrylate, acrylic acid, methacrylic acid, or a mixture of any of the foregoing; and (iii) a precompounded homogeneous resin composition, compatible under working conditions, of an olefinic resin and an elastomeric polyisobutylene resin, said modifier being present in said mixture in an amount at least sufficient to impart to said mixture a resistance to environmental stress crazing and cracking greater than that possessed by said polycarbonate resin.

The amounts of modifier combination to be employed vary broadly but, in general, best results will be obtained when the modifier is added to the polycarbonate resin in amounts ranging from about 4 parts to about 50 parts by weight per 100 parts by weight of the polycarbonate resin and the modifier. When less than about 4 parts are used, the improvement in the craze resistance of the polycarbonate is generally not readily detectable and, where the amount exceeds about 50 parts, the mixture begins to lose the beneficial properties of the polycarbonate. Preferably, the modifier is added in amounts ranging from about 10 to 30 parts per hundred of combined (a) and (b). Such addition may be accomplished in any manner so long as a thorough distribution of the modifier in the polycarbonate resin is obtained. For example, the mixing of materials may be accomplished by a variety of methods normally employed for incorporation of plasticizers or fillers into thermoplastic polymers, including but not limited to, mixing rolls, doughmixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion and blow molding techniques, alone, or in any combination. Also, multiprocessing methods, such as extrusion-blow molding or co-extrusion-co-injection, can be used, e.g., for multi-layer containers. It should be understood that the polycarbonate resin mixtures prepared in accordance with the invention may also contain, in addition to the above-mentioned polymers, other additives to lubricate, reinforce, prevent oxidation, or lend color to the material. Other additives such as mold release agents and stabilizers, are well known in the art, and may be incorporated without departing from the scope of the invention.

In addition to exhibiting an increased resistance to environmental stress crazing and cracking, the improved polycarbonate resin mixtures of the invention exhibit a relatively high impact strength without a substantial loss of tensile properties, and to a large extent retain the high softening temperature of unmodified polycarbonate resin materials.

The fact that the addition of the combination of components specified above to a polycarbonate resin system provides a resinous mixture having an improved resistance to environmental stress crazing and cracking is totally unexpected and not fully understood.

The aromatic carbonate polymers (a) used to provide polycarbonate mixtures of the present invention may be prepared by reacting a dihydric phenol with a carbonate precursor, such as phosgene, a haloformate or a carbonate ester. Generally speaking, such carbonate polymers may be typified as possessing recurring structural units of the formula:

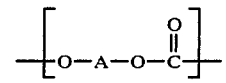

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl./g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are 2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention. Branched polycarbonates are also useful. To avoid unnecessarily detailed description, the disclosures of U.S. Pat. Nos. 3,028,365; 3,334,154; 4,001,184; 4,131,575; are incorporated herein by reference. In any event, the preferred aromatic carbonate polymer is a homopolymer derived from 2,2-bis(4-hydroxyphenyl) propane (bisphenol A).

Generally speaking, the modifier combination components (b)(i), (b)(ii) and (b)(iii) which are admixed with polycarbonate resins to provide the resins mixtures of the invention are themselves well known commercially available thermoplastic resin materials.

The coupled block copolymer resin component (b)(i) will comprise block polymerized units of vinyl aromatic compounds, e.g., styrene, alpha-methylstyrene, vinyl toluene, para-methylstyrene and the like connected to blocks of polymerized diene units, e.g., units of butadiene, isoprene, 1,3-pentadiene, and the like. The preferred block copolymers will comprise units of polymerized styrene and polymerized butadiene. The butadiene portion, based on the total weight of the copolymer, can range from about 15 to about 40 weight percent. The styrene portion can range from about 60 to about 85 weight percent. In especially preferred butadiene-styrene copolymers, the weight ratio of the styrene fraction to the butadiene fraction ranges from about 2 to 1 to about 3 to 1. The residual dienic unsaturation can be removed by selective hydrogenation, if desired. The block copolymers may be made by any of several procedures well known to those skilled in the art. A suitable commercial material is Phillips Petroleum K-Resin KRO3 BDS polymer. This has a styrene-butadiene weight ratio of about 3:1 and a density of the order of about 1.01 g./cm$^3$, see U.S. Pat. Nos. 3,639,517 and 4,091,053, incorporated herein by reference.

Copolymer component (b)(ii) is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer for use as component (b)(ii) is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite ® DPD-6169 ethylene-ethyl acrylate copolymer is suitable for use in the present invention.

Component (b)(iii), is a precompounded homogeneous composition of an olefin homopolymer or copolymer resin with an elastomeric polyisobutylene resin. Generally, component (b)(iii) is formed by blending materials well known in the art as comprising each class. Preferably, precompounded resin composition component (b)(iii), is a homogeneous blend, compatible under working conditions, which is formed by placing the polyolefin resin in a Banbury mixer, or the like, and melting it and bringing it to a flux. Thereafter, the elastomeric polyisobutylene resin is added to the molten polyolefin resin and agitation in the mixer is carried out for a reasonable time, e.g., from 3 to 10 minutes, until the polyisobutylene resin goes into solution without the need for solvents. The resultant compatible blend, may be re-extruded into pellets for incorporation into molding compositions under normal processing conditions and remains compatible showing little or no signs of striation or checking.

More particularly, the temperature at which the polyolefin resin is to be heated prior to the blending with the elastomeric polyisobutylene resin is dependent on the nature of the polyolefin. The temperature is not precisely critical as long as a homogeneous compatible blend is formed, however optimum ranges may be given. For example, with low density polyethylene, namely polyethylene having a density of between 0.910 and 0.935, a preferred temperature range is between 98° C. and 116° C., whereas with high density polyethylene, namely, a polyethylene with a density above 0.945, the temperature range is between 122° C. and 142° C., and further, with a polypropylene, the temperature range is between 179° C. to about 185° C.

By "polyolefin" resin as used herein with reference to blend component (b)(iii), is meant a polyethylene resin, or polypropylene resin, or a polyethylene or a polypropylene copolymer resin in which a major weight percentage of the copolymer constitutes either polyethylene or polypropylene, or mixtures of polyethylene or polypropylene and one of the aforesaid copolymers. The preferred polyolefin resin for use herein is a low density polyethylene resin.

Suitable commercial products available for use as the polyolefin resin component of the precompounded resin composition component (b)(iii) herein are numerous and may be exemplified by the following: Alathon 10, a polyethylene having a density of 0.923 and a melt index of 2.1; Alathon 14, a polyethylene having a density of 0.914 and a melt index of 1.8; Alathon 16, a polyethylene having a density of 0.923 and a melt index of 4.0; Alathon 20, a polyethylene having a density of 0.921 and a melt index of 2.1; Alathon 22, a polyethylene having a density of 0.921 and a melt index of 3.0; Alathon 34, a polyethylene having a density of 0.930 and a melt index of 3.0; Marlex 3328, a polyethylene having a density of 0.933 and a melt index of 2.8; Marlex 6002, a polyethylene having a density of 0.960 and a melt index of 0.2; Marlex 6009, a polyethylene having a density of 0.96 and a melt index of 0.9; Marlex 6050, a polyethylene having a density of 0.96 and a melt index of 5.0; Marlex 5003, a polyethylene having a density of 0.95 and a melt index of 0.3; Marlex 5012, a polyethylene having a density of 0.95 and a melt index of 1.2; Marlex 5040, a polyethylene having a density of 0.95 and a melt index of 4.0; Avisun 1044, a polypropylene having a density of between 0.905 to 0.915, and a melt index of 2.5; Escon 103, a polypropylene having a melt index at 230° C. of 1.5; Escon 104, a polypropylene having a melt index at 230° C. of 3.5; and Escon 105, a polypropylene having a melt index at 230° C. of 5.5.

The elastomeric polyisobutylene resin components of the precompounded (b)(iii) resin composition are generally well known and commercially available materials. Polyisobutylene may range in properties from an oily liquid to a rubbery elastomeric solid primarily on the basis of its average molecular weight, with its elastomeric properties increasing as the average molecular weight increases. By "elastomeric" polyisobutylene herein is meant isobutylene polymers having, in general, molecular weights greater than 75,000, and preferably on the order of 100,000 to 200,000 and above, with a density of about from 0.8 to 1.0.

The methods for the preparation of these polymers for use in precompounded resin composition component (b)(iii), both commerical and non-commercial, are abundantly described in the literature and known to those skilled in this art.

More particularly, the polyethylenes can be prepared by various procedures, using anionic, cationic or free-radical initiating catalysts, with conditions varied to produce a range of molecular weights and densities and different degrees of branching or non-branching for the polymer. In one procedure, which involves free radical initiation, ethylene gas is polymerized in the presence of a peroxide initiating catalyst at a pressure between 15,000 and 40,000 psi and a temperature between 100° and 200° C. to produce a relatively low density polymer, 0.90 to 0.94 g/cm³.

The polyethylene can also be prepared by low pressure processes effective to attain a polymer of higher molecular weight and a higher density. In one such procedure, known as the Phillips process, ethylene is contacted in an insert solvent with a slurry of a catalyst, such as chromium oxide supported on silica-alumina, at pressures of 400 to 500 psig and temperatures of 130° to 170° C., followed by extraction of the polymer with hot solvent and purification, to produce a polyethylene product having a density between 0.96 to 0.97 g/cm³.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present compositions.

Also employable in component (b)(iii) is polypropylene, a common commerical form of which is crystalline isotactic polypropylene. Such polymers can be prepared anionically by initiated reactions using Ziegler type catalysts, e.g., titanium halide such as $TiCl_3$ in combination with an organometallic co-catalyst such as trialkyl aluminum halide. Polymerization generally proceeds rapidly at temperatures between 25° and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst (e.g., transition metal compound and organometallic compound), or by free radical initiation under high pressures.

The preferred linear low density polyethylene in component (b)(iii) may be prepared by state-of-the-art polymerization processes such as those described in U.S. Pat. No. 4,076,698 and Eur. Pat. Appl. No. 4,645, both of which are incorporated by reference. The polymer may have a density between 0.89 and 0.96 g./cc. and a controlled concentration of simple side chain branching as opposed to random branching which distinguishes it from polymers such as high pressure low density polyethylene and high density polyethylene. The preferred range of density is 0.915 to 0.945 g./cc.

The elastomeric polyisobutylene resin is itself commerically available, but may be prepared from the monomer which is available in reagent grade commercially, or which may be prepared in known ways, such as by the dehydration of 2-methyl-1-propanol, as well as by treatment of n-butenes with isomerizing agents, such as phosphoric acid, under high temperature conditions.

The isobutylene monomer, unlike the ethylene monomer, is not polymerized by free-radical catalysts or by anionic catalysts such as metallic sodium, sodamide in liquid ammonia, or the sodium complex of naphthalene in tetrahydrofuran. However, the monomer is highly reactive in the presence of common mineral and organic acids particularly in the presence of very small quantites of cocatalyst. For example, polymerization of isobutylene may be effected in the presence of boron trifluoride or titanium tetrachloride if millimolar to micromolar concentrations of water are added as a cocatalyst.

In another way, isobutylene can be polymerized with Ziegler-type catalysts, described above. For example, the addition of small amounts of titanium tetrachloride-triethylaluminum forms an active catalyst in the presence of an inorganic promoter, e.g., a compound of the type which can combine with the metal halide to form a protonic acid, to form relatively low molecular weight ($\overline{Mn}$ 5,000–6,000) polyisobutylene at room temperature and higher molecular weight, namely $\overline{Mn}$ 12,000 and above polyisobutylene at reduced temperatures of −50° C. to −100° C.

In still another way, isobutylene can be polymerized by the use of radiation as the initiator. High energy radiation from both isotopic sources and from Van de Graff accelators may be used on the bulk monomer at low temperatures of about −78° C. to −137° C. The polymer formed by this type of initiation separates from the reaction liquid as a swollen gel. Preferably, the radiation reaction is carried out on a solution of propane or n-pentane, the latter preferably, because the polymer remains in solution at the lower temperatures and conversion of the monomer to polymer is considerably higher than in the case of polymerization in bulk. Generally, if low temperatures of −78° C. to −137° C. and low dosages of radiation on the order of less than 5 Mrads, are utilized, polyisobutylene having viscosity-average molecular weights of about $10^6$ can be obtained.

Commerically, the elastomeric polyisobutylene may be prepared by feeding a chilled feed at about −95° C. of isobutylene in an inert diluent, such as methylene chloride, to a large, well agitated reactor. The reactor temperature is controlled by passage of condensed ethylene through the jacket housing. Catalyst solution, precooled to −95° C., usually aluminum chloride dissolved in methylene chloride with millimolar amounts of water are admitted to the reactor. Immediately upon contact of feed and catalyst, the polymer is formed. The reaction is highly exothermic, and the heat liberated is estimated to be about 10,000 calories per mole. The polymer separates from the reaction liquor as discrete particles, and a portion of the liquor is allowed to overflow into a flash tank containing hot water. Volatile components are flashed off and recovered by distillation, thereby leaving the polymer in a water slurry. The polymer slurry is lead to a vibrating screen where most of the water is removed. The resulting moist crumb is passed through a tunnel drier to further remove water. The crumb is then hot extruded, milled, sheeted, or chopped, then cooled and boxed.

The elastomeric polyisobutylene resin is precompounded with the polyolefin resin as described above to form resin composition component (b)(iii). As has already been mentioned the olefin resin and the elastomeric polyisobutylene resin are commercially available. These commercial products may be precompounded as described above to form component (b)(iii). The precompounded resin composition (b)(iii) may, without limitation, comprise from about 25 to 75% by weight of the polyolefin resin component and from about 75 to 25% by weight of the elastomeric polyisobutylene resin component. As has already been mentioned, the olefin resins and the elastomeric polyisobutylene resins are commerically available materials which may be precompounded in the weight ratios provided above in the process described above to form the homogeneous compatible resin composition (b)(iii). One precompounded, homogeneous compatible resin composition of this type comprising approximately 50/50 weight percent low density polyethylene/polyisobutylene is commerically available under the trade designation HC5201, from Heisler Compounding Division, Container Corporation of America, Wilmington, Del.

Within the broad composition ranges specified above, the following have been found to provide desirable properties for the quaternary mixtures: polycarbonate component (a) comprises from about 60 to about 92 parts by weight; component (b)(i) comprises from about 5 to about 20 parts by weight; olefin-acrylate or methacrylate component (b)(ii) comprises from about about 5 to 20 parts by weight and precompounded resin composition component (b)(iii) comprises from about 1 to 10 parts by weight, per 100 parts by weight of components (a), (b)(i), (b)(ii) and (b)(iii) combined.

The resistance to environmental stress crazing and cracking of the polycarbonate resin mixtures prepared in accordance with the invention was determined by subjecting stressed specimens to gasoline soaking and then measuring their impact strengths with special attention to the mode of failure, ductile failure being preferable. The specimens are ASTM D-256 impact test bars of two sizes: $2\frac{1}{2}''\times\frac{1}{2}''\times\frac{1}{8}''$ and $2\frac{1}{2}''\times\frac{1}{2}''\times\frac{1}{4}''$. Values of the desired stress were applied to each test bar by mounting on an ASTM stress jig (1 percent strain). The mounted bars were soaked 2 hours at room temperature in AMOCO ® unleaded premium grade gasoline. They were then removed from the jig, evaporated and dried for 24 hours. Izod impact strengths were then determined according to ASTM D-256 procedures on notched specimens. In all cases, the properties are compared with those of identical unsoaked, molded mixtures. Those which retain a substantial amount of impact resistance after soaking obviously are the best at resisting environmental stress cracking.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were molded into the test specimens in a 3 oz. Van Dorn injection molding machine. The temperatures used were 270° C. on the cylinder and nozzle with a range of from 265° C. to 285° C.

EXAMPLES 1-3

An aromatic polycarbonate derived from 2,2-bis(4-hydroxyphenyl) propane and having an intrinsic viscosity (iv) in the range of from about 0.46 to about 0.49 dl/g as determined in a methylene chloride solution at 25° C. (LEXAN ® 140, General Electric Company) was mixed with a butadiene-styrene coupled resinous block copolymer (KRO3, Phillips Petroleum Company, hereinafter referred to as BDS), said copolymer having a weight ratio of styrene to butadiene of about 3.0 to 1.0; an olefin-acrylate copolymer having a weight ratio of ethylene: ethyl acrylate of about 4.5:1 (DPD 6169, Union Carbide Company); and a precompounded homogeneous compatible resin composition having a weight ratio of low density polyethylene: elastomeric polyisobutylene of about 1:1 (HC5201, Heisler Compounding Division, Container Corporation of America). The ingredients were then blended together by mechanically mixing them in a laboratory tumbler and the resulting mixture was fed to an extruder which was operated at about 255° C. The resulting extrudates were comminuted into pellets. The pellets were injection molded at about 265° C. to about 285° C. into test specimens of about $2\frac{1}{2}''$ by $\frac{1}{2}''$ by $\frac{1}{4}''$ and $2\frac{1}{2}''$ by $\frac{1}{2}''$ by $\frac{1}{8}''$, the latter dimension being specimen thickness. Some of the specimens were mounted on an ASTM stress jig (1% strain) and soaked in AMOCO ® premium unleaded gasoline for 2 hours. They were removed from the jig, the gasoline allowed to evaporate at room temperature for 24 hours, and then they were tested. Where indicated, Izod impact strengths of these specimens were measured according to the notched Izod test, ASTM D-256, and are set forth in TABLE 1. The weld line strength of the samples was measured with the specimens prepared in a double gate mold in the same way as the notched Izod samples. When polymer melt was injected through the gates, a weld line was then formed in the center of the sample. Measurements were made according to ASTM D-256. The numerical superscripts indicate the percent of test specimens which were ductile and the superscript H indicates that the sample failed in a hinged mode, which is an improvement over brittle failure. The sample labeled control was the bisphenol-A polycarbonate containing no modifier or an incomplete modifier combination as indicated. The formulations used and the results obtained are set forth in TABLE 1.

TABLE 1

POLYCARBONATE MODIFIED WITH COUPLED RESINOUS COPOLYMER, OLEFIN-ACRYLATE COPOLYMER AND PRECOMPOUNDED RESIN COMPOSITION OF POLYOLEFIN RESIN AND ELASTOMERIC POLYISOBUTYLENE RESIN

| EXAMPLE | A* | B* | 1 | 2 | 3 |
|---|---|---|---|---|---|
| COMPOSITION (pbw) | | | | | |
| Aromatic polycarbonate[a] | 100 | 82 | 82 | 82 | 82 |
| BDS block copolymer[b] | — | 10 | 10 | 10 | 10 |
| Ethylene-ethyl acrylate copolymer[c] | — | 2 | 6.0 | 4.0 | 2.0 |
| precompounded homogeneous compatible polyethylene/polyisobutylene composition[d] | — | — | 2.0 | 4.0 | 6.0 |
| polyethylene | — | 3 | — | — | — |
| polyisobutylene | — | 3 | — | — | — |
| PROPERTIES: | | | | | |
| Notched Izod impact strength | | | | | |
| $\frac{1}{8}''$, ft-lbs/in. | 14.8 | 14.0 | 12.1 | 12.4 | 10.4 |
| $\frac{1}{4}''$, ft-lbs/in. | 1.6° | 9.8 | 9.9 | 9.9 | 10.2 |
| Weld line strength, ft-lbs. | 40 | 1.7[0] | 5.9[H] | 3.1[H] | 2.0[0] |
| SOAKED IN GASOLINE | | | | | |
| $\frac{1}{8}''$, ft-lbs/in. | broke | 14.0 | 12.1 | 12.4 | 10.4 |
| $\frac{1}{4}''$, ft-lbs/in. | — | 6.3 | 9.0 | 9.8 | 9.4 |

*Control.
[a] LEXAN ® 140, General Electric Company
[b] KRO3, Phillips Petroleum Company
[c] DPD 6169, Union Carbide Company.
[d] HC5201, Heisler Compounding Division.

The results demonstrate that the impact strengths of the new compositions of Examples 1-3 were substantially retained or better than polycarbonate alone in gasoline soaked testing at both the $\frac{1}{8}$ and $\frac{1}{4}$ inch thickness. Additionally, the precompounded polyethylene-isobutylene had far better retention of impact strength after gasoline soaking in the $\frac{1}{4}$ inch sample, Example 3, than the corresponding Example, Control B, wherein the same proportions were used but the polyethylene and polyisobutylene not precompounded.

The above-mentioned patents, applications, and publications are incorporated herein by reference. Obviously, many variations will suggest themselves to those skilled in this art in light of the detailed description herein. For example, instead of bisphenol-A polycarbonate, one containing units derived from tetramethyl-bisphenol-A or from dixylenol sulfone can be used. Instead of a butadiene-styrene copolymer an isoprene-styrene copolymer can be used. Instead of an ethylene-ethyl acrylate copolymer, there can be used copolymers of ethylene and methyl methacrylate, ethylene and acrylic acid and ethylene and methacrylic acid. Instead of the precompounded homogeneous compatible polyethylene resin/polyisobutylene resin composition, there can be substituted a precompounded homogeneous compatible polypropylene resin/polyisobutylene resin composition. The compositions can be provided in flame retardant modifications. All such obvious variations are within the scope and spirit of the subject invention as defined by the appended claims.

What is claimed is:

1. A resin mixture comprising:
(a) from about 60 to about 92 parts by weight of an aromatic polycarbonate resin; and
(b) a modifier combination therefor comprising
  (i) from about 5 to about 20 parts by weight of a coupled resinous block-copolymer having blocks comprising polymerized vinyl aromatic units connected to blocks comprising polymerized diene units, wherein the residual dienic unsaturation is not removed by selective hydrogenation;
  (ii) from about 2 to about 20 parts by weight of a copolymer of an olefin and at least one of a $C_1$–$C_6$ alkyl acrylate, a $C_1$–$C_6$ alkyl methacrylate, acrylic acid, methacrylic acid, or a mixture of any of the foregoing; and
  (iii) from about 1 to about 10 parts by weight of a precompounded homogeneous resin composition, compatible under working conditions, of an olefinic resin selected from the group consisting of a polyethylene resin, a polypropylene resin, a polyethylene copolymer resin in which a major weight percentage of said copolymer comprises polyethylene, a polypropylene copolymer resin in which a major weight percentage of said copolymer comprises polypropylene and a mixture of polyethylene or polypropylene and one of the foregoing copolymers and an elastomeric polyisobutylene resin,
said modifier being present in said mixture in an amount at least sufficient to impart to said mixture a resistance to environmental stress crazing and cracking greater than that possessed by said polycarbonate resin, per 100 parts by weight of components (a), (b)(i), (b)(ii), and (b)(iii) combined, said polycarbonate resin comprising the reaction product of a dihydric phenol and a carbonate precursor, the dihydric phenol consisting essentially of one or more of the following dihydric phenols
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether; and
4,4'-dihydroxy-3,3'-dichlorodiphenyl ether.

2. A resin mixture as defined in claim 1 wherein said aromatic polycarbonate (a) comprises poly (2,2-dihydroxydiphenylpropane) carbonate.

3. A resin mixture as defined in claim 1 wherein said copolymer resin (b)(i) comprises polymerized styrene units and polymerized diene units.

4. A resin mixture as defined in claim 1 wherein said copolymer component (b)(ii) comprises a copolymer of ethylene and ethyl acrylate.

5. A mixture as defined in claim 1 wherein in said precompounded homogeneous compatible resin composition component, (b)(iii), said olefin resin comprises a low density polyethylene resin.

6. A resin mixture as defined in claim 1 wherein in said precompounded homogeneous compatible resin composition component (b)(iii), said elastomeric polyisobutylene resin has an average molecular weight of at least 75,000.

7. A resin mixture as defined in claim 1 wherein in said precompounded homogeneous compatible resin composition component (b)(iii), said olefinic resin comprises from about 25 to 75 parts by weight and said elastomeric polyisobutylene resin comprises from about 75 to 25 parts by weight, based upon the weight of the overall precompounded resin composition.

8. A resin mixture as defined in claim 1 wherein the modifier combination is present in such total proportions and each proportion of (b)(i), (b)(ii) and (b)(iii) that the said resin mixture will have better resistance to environmental stress cracking and crazing than the same resin mixture proportion wise prepared from non-precompounded olefin resin and elastomeric polyisobutylene resin.

9. A resin mixture as defined in claim 1 wherein the amount of modifier combination (b) ranges from about 10 to about 30 parts by weight per 100 parts by weight of resin (a) and modifier combination (b) together.

* * * * *